No. 640,030. Patented Dec. 26, 1899.
M. RIETZKE.
KITCHEN STOVE UTENSIL.
(Application filed Aug. 7, 1899.)
(No Model.)
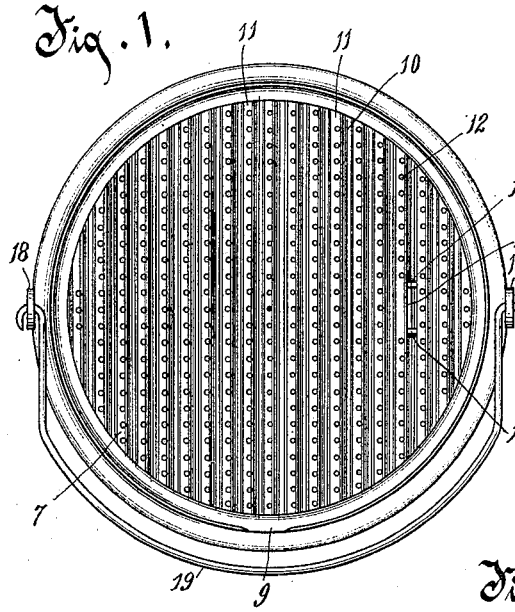
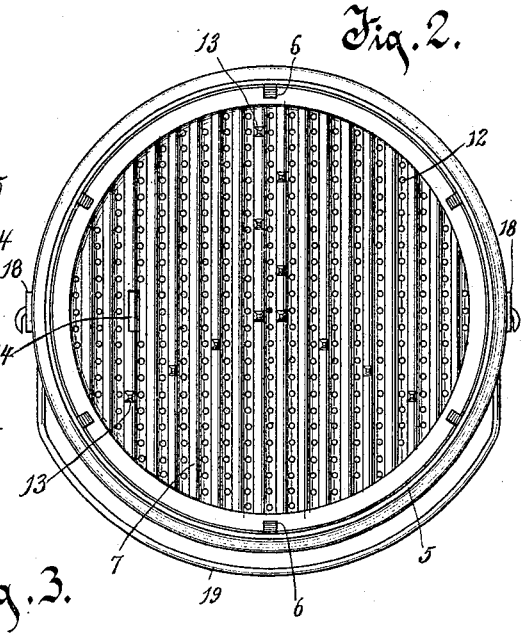
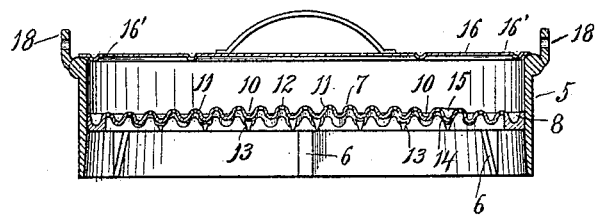
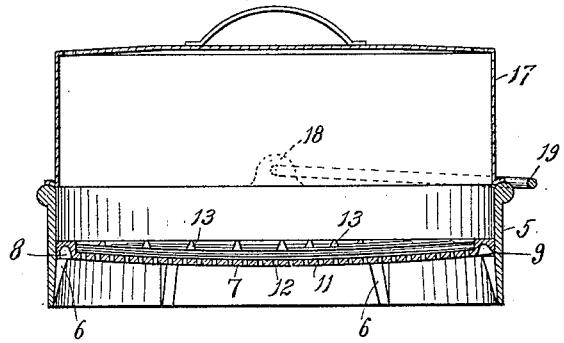
Witnesses.
O. H. Keeney.
Anna C. Faust.
Inventor.
Mathilda Rietzke
By Benedict & Morsell
Attorneys.

UNITED STATES PATENT OFFICE.

MATHILDA RIETZKE, OF MILWAUKEE, WISCONSIN.

KITCHEN-STOVE UTENSIL.

SPECIFICATION forming part of Letters Patent No. 640,030, dated December 26, 1899.

Application filed August 7, 1899. Serial No. 726,366. (No model.)

*To all whom it may concern:*

Be it known that I, MATHILDA RIETZKE, of Milwaukee, in the county of Milwaukee and State of Wisconsin, have invented a new and useful Improvement in Kitchen-Stove Utensils, of which the following is a description, reference being had to the accompanying drawings, which are a part of this specification.

My invention relates to an improved utensil adapted to be used in connection with any kitchen-stove, and especially in connection with a gas, gasoline, or oil stove, for broiling, cooking, or heating purposes. The utensil is portable and is adapted to be placed on the stove above and about the ordinary stove-opening therein in such manner as to permit the heat of the fire in the stove to come up through the stove-opening into the utensil, in which, because of the peculiar construction of the utensil, the heat is all preserved and utilized in the most efficient and desirable manner. The invention consists of the utensil, its parts, and combinations of parts, as herein described and claimed, or the equivalents thereof.

In the drawings, Figure 1 is a top plan view of the utensil without its cover. Fig. 2 is an under plan view of the utensil. Fig. 3 is a transverse section of the utensil with such a cover thereon as is employed when the utensil is used for broiling and the plate or gridiron in place in the position in which it is used for broiling. Fig. 4 is a transverse section of the utensil with a cover adapted for use therewith when the utensil is used for heating flat-irons and the plate or gridiron being in the position it is placed in when used for heating irons or supporting culinary vessels.

In the drawings, 5 is the shell or case of the utensil, and consists of a circular band of metal, preferably cast malleable iron, of such length as to provide therein a chamber of a desirable height, ordinarily about three or four inches, and of such size circumferentially as adapts it to rest on the surface of a stove immediately about the stove-opening in its top. On the inside of the shell 5, medially of its height, a number of lugs or brackets 6 6 are provided integral therewith, on which the plate or gridiron 7 rests removably. This plate or gridiron is in general contour a circular disk or plate fitting substantially but loosely in the shell 5 and adapted to be lifted therefrom for the purpose of cleaning or for reversing its position, so that either surface, as desired for the especial use to which it is to be put, may be made the upper surface. This gridiron is preferably constructed of cast malleable iron and is crowning or raised centrally on one surface and is correspondingly dished or depressed centrally on the other surface. This gridiron is provided on one surface, which is the surface employed for broiling and is shown as exposed upwardly in Figs. 1 and 3, with a circular groove or channel 8 near its periphery, which is adapted to receive therein the fluids that are discharged from the meat thereon in the process of broiling, and the outer wall of this channel 8 is provided with a depression 9, adapted for conveniently pouring and thereby discharging the fluids from the gridiron when it is uptilted. The surface of the gridiron within the circular channel 8 is corrugated, conveniently and preferably transversely thereof, but in such manner that the fluids discharged from the meat in the process of broiling will fall into the grooves 10 of the corrugations and by reason of the crowning form of this surface of the gridiron will run outwardly into the channel 8. The ridges 11 of the corrugations that alternate with the grooves 10 are perforated with a large number of apertures 12, whereby the hot air produced by the combustion below the utensil passes freely upwardly through the gridiron, directly against the meat thereon, when the gridiron is in the position shown in Figs. 1 and 3 and is being used as a broiler. When the gridiron is reversed, and thereby put in the position shown in Figs. 2 and 4, it is adapted for supporting a culinary vessel thereon or flat-iron for being heated.

On the reverse side of the gridiron or plate 7 I provide a number of little legs or bosses 13, preferably of such height on this dishing surface of the plate as to bring the outer ends of these legs all into a common flat plane preferably with the rim of the plate, so that a kettle or pan placed on these legs will have an even supporting-surface therefor. I preferably so arrange these legs 13 on the surface of the plate that the spaces around and radiating from the center of the plate are adapted to receive flat-irons therein, which flat-irons, of the usual form, will rest directly on the corrugated surface of the plate between the radiating radial lines of legs thereon. By this construction the gridiron or plate 7 is adapted when in the position shown in Figs. 2 and 4 for supporting thereon flat-irons between the radial lines of legs 13 for heating those irons and for receiving on the legs 13 a pan or flat-bottomed kettle or similar utensil for heating it. An elongated aperture 14 is provided in the plate for inserting a handle therein for lifting it. This aperture is preferably formed in the plate through what is a groove thereof when the plate is in the position shown in Figs. 1 and 3, and the ends of this aperture are guarded by little dams or guards 15 15 as high as the walls of the corrugation, so that the meat fluids cannot run into and through the aperture. I also provide a cover 16, advisably constructed of sheet metal and adapted to rest on the top edge of the case 5, to close at the top the chamber formed by the shell 5. This form of cover (shown in Fig. 3) is especially adapted for use when the utensil is being used for broiling. It is advisably provided with a number of ventilating-apertures 16'. When the utensil is to be used for heating flat-irons or even for heating material in a pan resting on the plate, when in the position shown in Fig. 4, I provide an elevated cover 17, which rests on the top of the shell 5 and is of sufficient height to cover the handles of the flat-irons or to extend above the walls of a pan or kettle. For conveniently handling this portable utensil the shell 5 is provided with ears 18 and with a bail 19.

What I claim as my invention is—

1. In a kitchen-stove utensil, the combination with a cylindrical shell provided interiorly with supporting-lugs, of a reversible plate fitted in the shell resting on the lugs, said plate being crowning and provided with corrugations forming alternate grooves and ridges, the ridges being perforated, and short projecting legs on the dishing surface terminating in a common flat plane.

2. In a kitchen-stove utensil, the combination with a cylindrical shell provided interiorly with supporting-lugs, of a reversible plate fitted in the shell resting on the lugs, said plate being crowning and provided with corrugations forming alternate grooves and ridges, the ridges being perforated, and short projecting lugs on the dishing surface arranged in radial lines adapted to receive flat-irons between them on the surface of the plate.

3. A portable kitchen-stove utensil comprising a cylindrical shell provided interiorly with supporting-lugs, a reversible plate fitted in and resting removably on said lugs, said plate being crowning on one surface and dishing on the other surface, grooves on the crowning surface to catch fluids, perforations in the plate extrinsic of the bottom and walls of the corrugations, and legs on the dishing surface the ends of which are in a common flat plane.

In testimony whereof I affix my signature in presence of two witnesses.

MATHILDA RIETZKE.

Witnesses:
C. T. BENEDICT,
C. H. KEENEY.